United States Patent [19]

Pardo et al.

[11] 4,089,427
[45] May 16, 1978

[54] MODULAR ROBOT HAVING AN ADAPTABLE CONFIGURATION

[75] Inventors: Pierre Pardo; François C. Pruvot, both of Meudon-la-Foret, France

[73] Assignee: Sofermo, Meudon-la-Foret, France

[21] Appl. No.: 723,665

[22] Filed: Sep. 15, 1976

[30] Foreign Application Priority Data

Sep. 22, 1975  France .................................. 75 28913

[51] Int. Cl.² ........................ B25J 17/00; B66C 13/12
[52] U.S. Cl. ............................. 214/1 CM; 214/1 BC; 214/1 BD; 403/261; 403/268; 403/375
[58] Field of Search ............. 214/1 CM, 1 BC, 1 BD, 214/1 BH, 1 BV; 403/268, 375, 377, 341, 372, 321, 365, 367, 364, 261

[56] References Cited

U.S. PATENT DOCUMENTS

| Re. 28,437 | 6/1975 | Devol ......................... 214/147 T X |
| 1,097,227 | 5/1914 | Hinckley ............................... 403/268 |
| 3,024,052 | 3/1962 | Oliveau ........................... 403/375 X |
| 3,033,059 | 5/1962 | Melton ...................... 214/1 CM X |
| 3,507,403 | 4/1970 | Moore .............................. 214/1 BD |
| 3,543,947 | 12/1970 | Devol .......................... 214/147 T X |
| 3,610,438 | 10/1971 | Opdahl ............................. 214/1 CM |

*Primary Examiner*—Drayton E. Hoffman
*Assistant Examiner*—George F. Abraham
*Attorney, Agent, or Firm*—Fleit & Jacobson

[57] ABSTRACT

Robots or industrial automatons comprising each: standard modules assembled like a meccano construction, said modules being adapted to perform the requisite basic functions and comprising a module of translation, a module of rotation of 2 k π, a module of rotation of less than 2 k π, a member consisting for example of a head having several axes, said standard modules being interconnected by means of arms sawed to the desired length before assembling the component elements of the robots.

10 Claims, 17 Drawing Figures

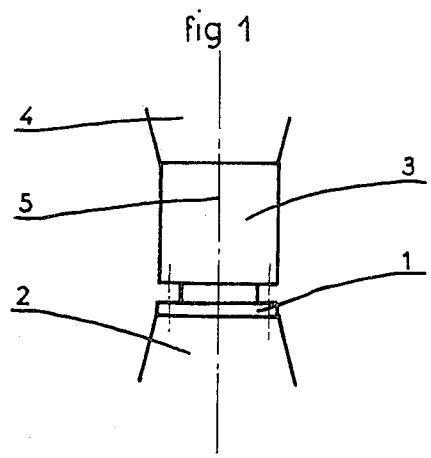
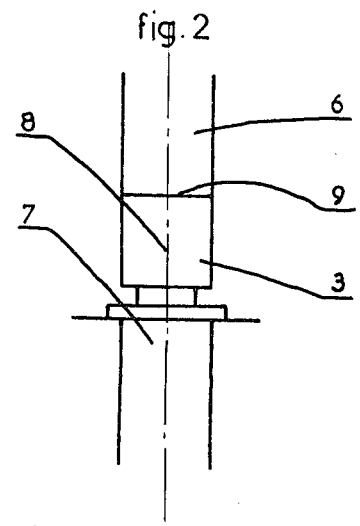
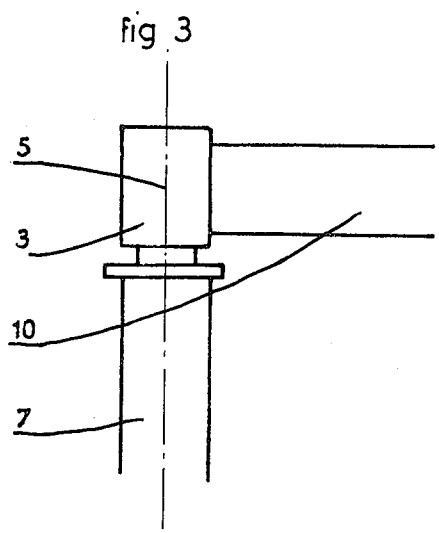
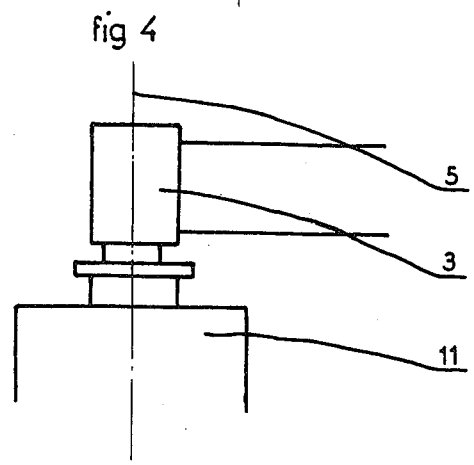
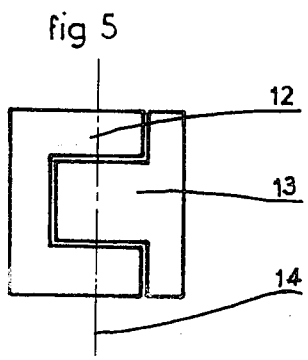
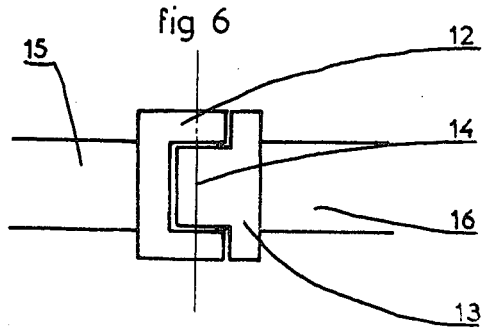

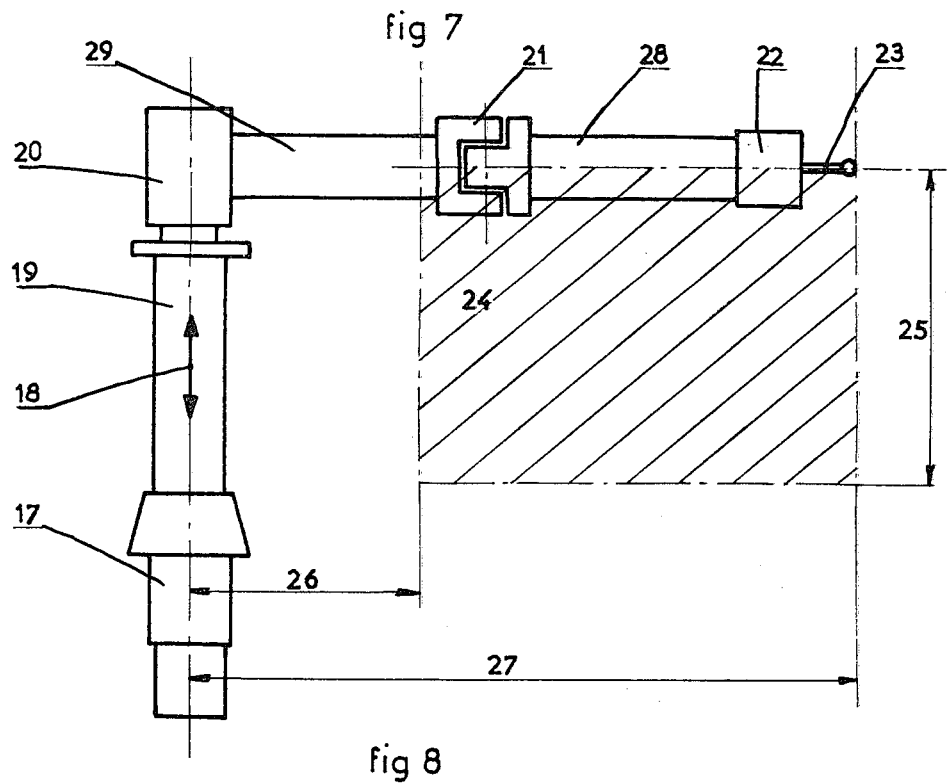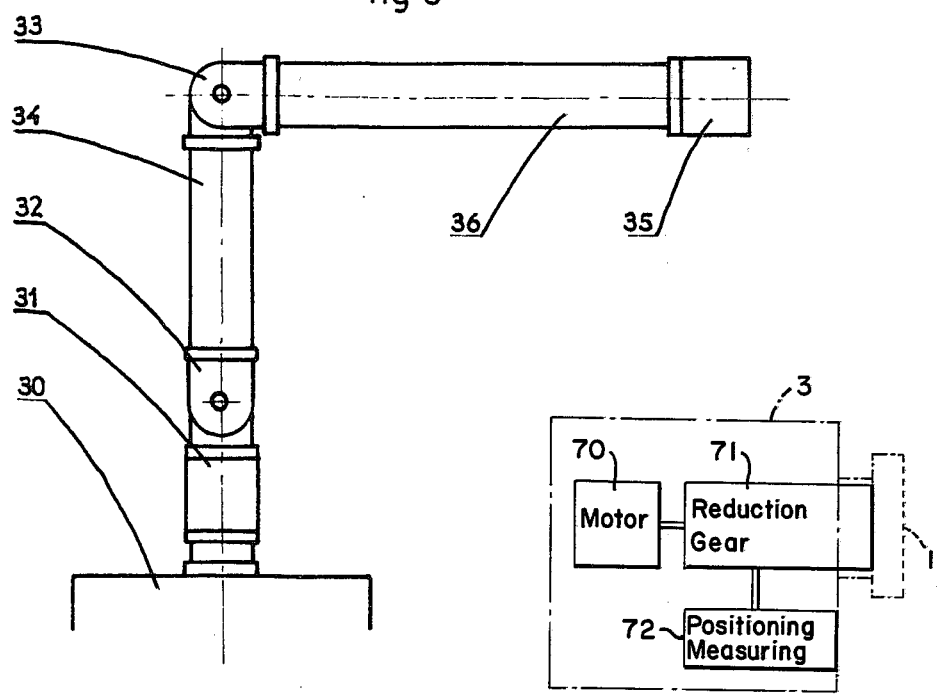

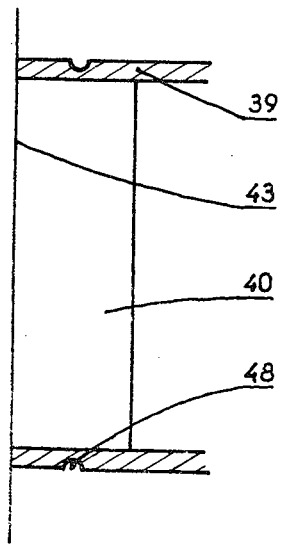
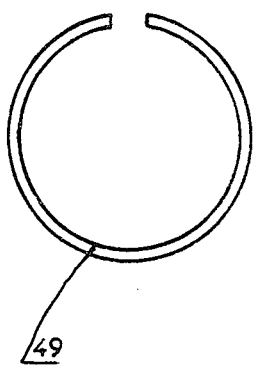
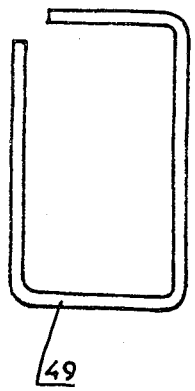
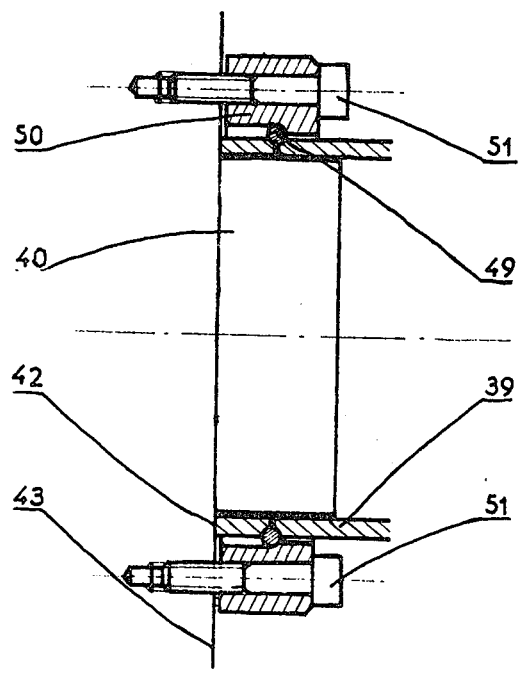

MODULAR ROBOT HAVING AN ADAPTABLE CONFIGURATION

The present invention relates to a modular robot or manipulator having a modifiable or adaptable configuration, and more particularly to a robot consisting of any suitable and desired number of functional modules, the invention being also concerned with the means for assembling these modules.

The present invention is related to the field of robots or automatons of the kind used for transporting or transferring objects from one point to another, for spot-welding or arcwelding parts to be assembled, and for obtaining assemblies from their component elements.

All presently commercially available robots or automatons are assemblies designed and constructed in their final configuration for the purpose contemplated. Most of them comprise four or five "axes" and at the most the user, purchaser or the like can request that a sixth "axis" be added thereto.

In actual practice, all these robots exist in only one dimension and as a rule one can easily increase the length of an "arm" or the stroke of an axis.

Moreover, since their "morphology" is established once for all, and since this "morphology" is not adapted for specific duties, it is a frequent occurrence that five, or even six axes are deemed necessary for obtaining a simple rectilinear movement of translation of an object. This is observed more particularly in the case of robots operating with spherical coordinates. In fact, moving along a simple straight line while maintaining the initial orientation of the object requires five axes, whereas another robot having a single axis of linear coordinates could easily perform the same work. From the foregoing, it can be inferred that a robot operating according to cartesian coordinates will resolve the problems better than a robot operating according to spherical co-ordinates.

In fact, transferring an object along a distance of 5 to 6 m by means of a robot operating according to the principle of spherical or cylindrical co-ordinates does not constitute a difficult problem if one cares little over the path followed by this object. On the other hand, a robot based on a cartesian co-ordinates system would be abnormally huge.

Finally, most existing robots are designed for operating in a well-defined direction in relation to the ground or floor; the fact that the hydraulic unit, and in many cases the control unit, is integrated in the robot itself prevents the robot from assuming any desired orientation in space.

It is the essential object of the present invention to avoid the above-defined inconveniences.

The modular robot according to this invention, which is of the adaptable configuration type, utilizing self-contained modules incorporating each a motor, a reduction gearing and a device for measuring the relative positions of the component elements of the module concerned, is characterized in that it comprises the number of self-contained modules incorporated therein correspond to the number of elementary movements it can perform, that these modules are ordinated and disposed in the co-ordinates axes system most consistent with the applications contemplated for the robot, and that two successive modules are interconnected by a connecting tube the length of which is subordinate to the use contemplated and to which said modules are secured by using standard fastening means.

More particularly, this invention is directed to the construction of mechanical robots of any desired configuration, dimensions and kinematics from a few modules providing the basic functions of:
Translation,
Rotation of 2 k $\pi$ (more than 360°),
Rotation of less than 2 $\pi$ (less than 360°),
Other known or unknown modules.

The object of this invention is to permit the construction of a robot operating in a system of spherical, cylindrical, cartesian or semi-cartesian coordinates, according as one or the other of these systems is better adapted for the functions devolved to the robot.

It is another object of this invention to define means for interconnecting these various modules so that said means can easily be constructed with any desired dimensions without requiring a new study for each robot configuration.

A further object of this invention is to provide mechanical means for positioning and interconnecting the modules and the connecting means themselves, said mechanical means being necessarily sturdy, reliable and economical. Moreover, said mechanical means must be such that they can be implemented by using extremely simple means precluding any complicated and high-precision machining operation. With this technique robots specially designed for performing a well-defined function can be constructed very rapidly.

Other features and advantages of the invention will appear as the following description proceeds with reference to the attached drawings, in which:

FIG. 1 illustrates a first method of connecting a module for a 2 k $\pi$ rotation;

FIG. 2 illustrates another method of connecting a module for a 2 k $\pi$ rotation;

FIG. 3 illustrates a third method of connecting a module for a 2 k $\pi$ rotation;

FIG. 4 illustrates a fourth method of connecting a module for a 2 k $\pi$ rotation;

FIG. 5 illustrates a module for a rotation of less than 2 k $\pi$;

FIG. 6 illustrates a method of connecting the module of FIG. 5;

FIG. 7 illustrates a first form of embodiment of a robot according to the teachings of this invention;

FIG. 8 illustrates another form of embodiment of a robot according to this invention;

FIG. 13 is a view similar to FIG. 11 showing a further stage during the fastening operation;

FIG. 14 illustrates two configurations of a connecting member,

FIG. 15 is an axial section illustrating a completed fastening device, and

FIG. 16 is a schematic illustration of a motor, reduction gearing unit, and position measurer used with the module depicted in FIG. 1.

Figure 9:
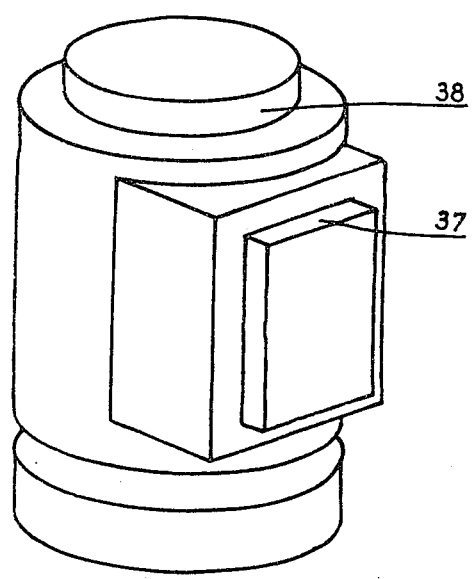
FIG. 9 illustrates a connecting device according to this invention.

It will be assumed that each robot function as defined hereinabove is obtained by using a "module." Thus, we may have in particular:

a short-stroke translation module ($\simeq 1$ m),
a module of rotation of $2\,k\,\pi$ (more than 360°),
a module of rotation of less than $2\,\pi$ (less than 360°),
a head module having 1, 2 or 3 axes, and
a long-stroke translation module ($\geqq 1$ m).

However, these various modules are no part of this invention, except for their members or portions necessary for connecting them to a fastening member designed for interconnecting the various modules.

Externally, these modules have the appearance and shapes described hereinafter, and it will be readily understood by those conversant with the art that these examples should not be construed as limiting the scope of the instant invention.

Thus, FIG. 1 illustrates the external appearance of a rotary module for a rotation $2\,k\,\pi$, i.e. capable of rotating more than one revolution.

It may be assumed that this module comprises a portion 1 secured to any member or structure 2 and another portion 3 secured to another member 4, so that portion 1 revolves in relation to portion 3 about an axis 5. The module thus imagined contains all the component elements necessary for actuating and controlling it (such as, as illustrated in FIG. 16, a motor 70 and reduction gearing unit 71) and also a unit 72 for measuring the relative position of portions 1 and 3 (including a coder or any other suitable electical, electronic or optoelectrical device). Without prejudice to the actual design of the module concerned, it is clear however that the members 4 to be driven may be of several different types.

In the rotational module illustrated in FIG. 2, the device permitting a $2\,k\,\pi$ rotation causes a column 6 to rotate in relation to aother column 7 about an axis 8. Therefore, column 6 must be fastened to the top end 9 of the rotary portion 3.

In FIG. 3, the rotational module for a $2\,k\,\pi$ excursion rotatably drives an arm 10 extending substantially at right angles to the axis 5. In order to reduce as much as possible the number of modules, it is desirable that in either case the module for $2\,k\,\pi$ be the same. In FIG. 4, the rotational module for a $2\,k\,\pi$ excursion is fixed to a frame 11. Here also the $2\,k\,\pi$ module has to be the same as herebefore.

Now considering the case of a module for producing a rotational movement of less than $2\,\pi$, for instance when it is desired to pivotally interconnect two members of a structure which have to be aligned in one position, it is clear that this requirement is not met with a module for $2\,\pi$.

As shown in FIG. 5, a module permitting a relative rotational movement of less than $2\,\pi$ may comprise a strap 12 pivoting about an axis 14 in relation to a member 13 projecting into the cavity of said strap 12. Also in this case, it is assumed that the module incorporates the motor, the reduction gearing and the means for measuring the relative positions of members 12 and 13. As a rule, this module is coupled to other component elements 15 and 16, as illustrated in FIG. 6, in order to constitute a kind of "elbow."

Now two examples will be described for illustrating the manner in which the present invention contemplates the construction of robots by interconnecting various modules with one another substantially according to the principle of a meccano.

As illustrated in FIG. 7, a short-stroke translation module 17 also incorporating a motor, a reduction gearing and a coder, is adapted to drive for translation in either directions of the double arrow 18 a column 19 coupled at its opposite end to a module 20 adapted to rotate through an angle $2\,k\,\pi$. The module 20 is connected via a perpendicular arm 29 to another module 21 permitting an angular movement of less than $2\,\pi$. The other portion of module 21 is connected via an arm 28 to an undefined member 22. The above-described assembly constitutes a "robot" having cylindrical coordinates for controlling the movement of a point 23 carried by member 22 within an annular cylindrical space 24 of which the lower half is shown as consisting of the hatched area 24 of the figure, the height 25 of this half-cylinder corresponding to the permissible stroke of the short-stroke translation module 17, the radii 26 and 27 of said lower half 24 depending of course on the dimensional properties of the coupling elements of modules 20, 21 and 22. It is obvious that this three-axes robot is amply sufficient for solving a wide range of handling problems consisting essentially in picking up an object at one place and depositing it at another place. The member 22 may be a head having 1°, 2° or 3° of additional liberty, which is assembled to the arm 28 in the same fashion as the modules 20 and 21 are assembled to the arms 28 and 29. This head also comprises, like the other modules, its built-in motors and sensors for measuring the various axes.

FIG. 8 illustrates a completely different robot structure yet consisting of the same basic component elements. A frame 30 supports a module 31 adapted to rotate to the extent of $2\,k\,\pi$ and connected to another module 32 permitting an angular displacement of less than $2\,\pi$. A third module 33 providing a rotational amplitude of less than $2\,\pi$ is coupled to module 32 through a connecting member 34. Finally, any desired member 35 equipped with hooking or gripping means, or comprising in turn one or a plurality of additional axes, is coupled to module 33 through another connecting member 36. It will be seen that this robot is capable of exploring a hollow spherical space, and is particularly suited for solving handling or manipulation problems involving considerable heights.

Of course, many exemplary applications requiring the use of other modules, such as long-stroke modules, operable according to cartesian or mixed coordinates, cylindrical cartesian coordinates, etc... will readily occur to those conversant with the art without departing from the basic principle of this invention.

It will also be seen that the basic conception of these robots is particularly advantageous in that it can easily assume the configuration best suited for each specific application.

Now the means for interconnecting the modules with one another and the devices for fastening these interconnecting means to the modules proper will be described in detail with reference to FIGS. 9 through 15 of the drawings.

The various robot structures disclosed hereinabove with reference to FIGS. 1 - 8 show that the connecting means are subjected mainly to torsion, flexion and torsion-cum-flexion stresses. It is for this reason that tubes have been choosen for constituting the connecting means. These tubes may have either a circular cross-section, as in the case of column 19 driven for translation by the short-stroke translation module 17 of FIG. 7, or a square or rectangular cross-section, like connecting members 28, 29 of FIG. 7 and 34, 36 of FIG. 8.

These tubes are cut to the desired and proper length for each specific application.

A conventional fastening method would consist in welding a flange to each tube end, but this would compulsorily entail the truing up of these flanges in order to have parallel planes. Finally, the assembling step would involve the use of screws on the modules and the latter would have to be locked in position most probably by using centering studs or the like.

The assembling method of this invention permits of dispensing completely with any welding operation as well as with any complementary machining after the welding operation. For this purpose, the tubes are cut to the proper length on a sawing machine. These two cutting steps are performed without releasing the tube in order to obtain the best possible parallelism between the end faces of the tube.

Figure 10:
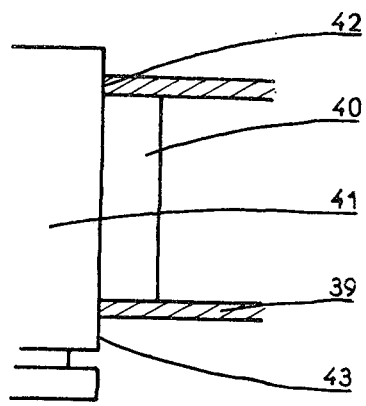
FIG. 10 is a fragmentary section taken along an axial plane perpendicular to the centering elements of FIG. 9.

Each module is provided with a kind of centering element having a rectangular or circular shape, according as the tube to be assembled therewith has a rectangular (37, FIG. 9) or circular (38, FIG. 9) cross-sectional shape, respectively. This centering element penetrates into the corresponding tube end as illustrated in FIG. 10. (A rectangular or circular) tube 39 is force-fitted on a centering element 40 carried by module 41, and the trued-up surface 42 of the tube engages a similarly trued-up surface 43 of the module.

These tubes may even have inaccurate internal dimensions, and it is obvious that a certain play, of the order of one millimeter, may exist between the tubes and the centering element carried by the module, this being sufficient for positioning the tube with precision in relation to the module.

Figure 11:
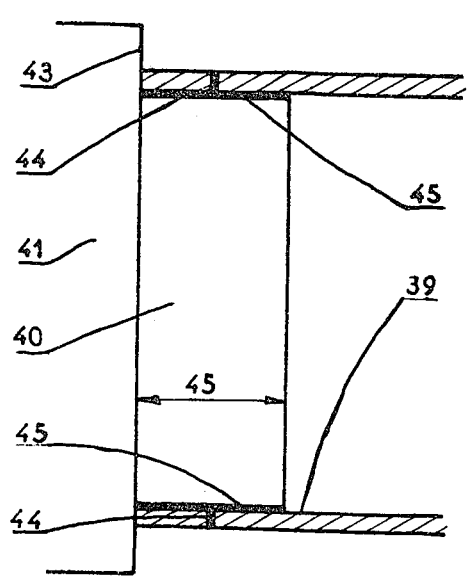
FIG. 11 is a view similar to FIG. 10 illustrating a further stage of the fastening procedure.
Figure 12:
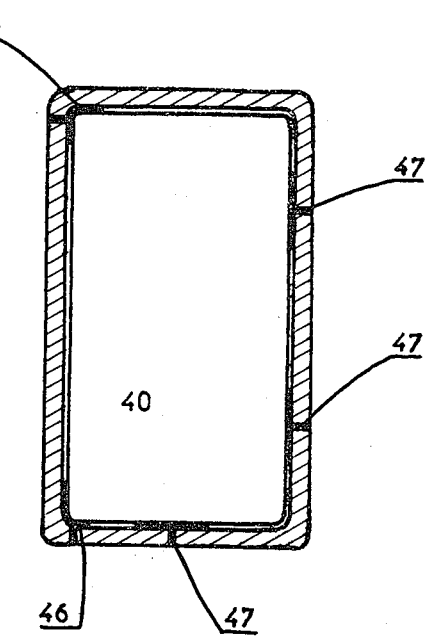
FIG. 12 is a section taken at right angles to the centering elements and parallel to the flat direction face of the device of FIG. 11.

Assuming that the tube 39 is held in position against the face 43 and positioned in relation to the centering element 40, its final position is locked definitively in relation to the centering element 40 by injecting through holes 44 formed in the tube (FIG. 11), substantially at mid-height of said element 40, a polymerizable plastic composition, or preferably a thermoplastic plastic composition, so as to fill up completely or partially the volume available between the tube 39 and the centering element 40, as shown in FIG. 11. In the case of a circular tube, at least three injection orifices are necessary, and in the case of a square or rectangular tube, at least four holes such as 46 are required, if these holes are located near the corners of the rectangle. Otherwise, at least six holes as shown at 47 are necessary (FIG. 12).

The relative positions of the connecting tubes and modules being thus definitely obtained, these parts must be definitively locked to one another.

For this purpose, a groove 48 having preferably a semi-circular cross-section is formed in the tube at a distance from the module face 43 which corresponds substantially to one-half of the thickness 45 of the centering element. In the case of circular-sectioned tubes, this groove may be simply turned on a lathe, or more simply milled so that the same machine can be used for rectangular-sectioned tubes. The diameter of groove 48 may range from about 3 to about 6 mm, according to the size of the connecting tube. In the case of rectangular-sectioned tubes, the groove is formed by milling (FIG. 13). A circlip 49 of corresponding diameter, i.e. circular in the case of circular tubes and rectangular for rectangular tubes, is fitted into the groove (FIG. 14-1 and FIG. 14-2, respectively).

Finally, a keeper ring 50 of adequate configuration (FIG. 15) is provided for pressing through the medium of circlip 49 the face 42 of the connecting tube against the registering face 43 of the module. Screws 51 passing through holes formed in said keeper ring 50 eventually lock the latter in position. In the case of rectangular or square tubes, the keeper rings cannot exert their locking pressure at the corners of the circlip and only the straight parts of the circlip serve for retaining the tube 39 against the face 43. In the case of square or rectangular tubes, another function of the plastic composition injected between the centering element and the tube is to prevent the latter from undergoing an inward distortion and becoming locked under the ring pressure. The keeper ring itself is dimensioned with a view to avoid the same effect but outwardly.

From the foregoing, it is clear that the construction of special robots from prefabricated modules may completed in a relatively short time by investing a relatively moderate initial capital, since the only tool means required are:

a sawing machine, a machine for milling the circular-sectioned groove, somewhat like a vertical wood shaper, (these two machines may be replaced by a machine adapted to saw the tube to the desired length while machining the groove), a machine for presenting the modules to one another during the injection of plastic composition.

It is obvious that on each module, the face 43 must be properly trued up and therefore machined; on the other hand, the centering element 40 due to the injection of plastic composition, may be manufactured through another procedure, such as moulding, cutting, etc...

Of course, the number of different tubes likely to be utilized, as well as the number of types and sizes of the various modules, should advantageously be kept to a minimum.

What is claimed as new is:

1. A modular robot having an adaptable configuration for operation in any coordinate axis system, utilizing self-contained modules each incorporating a pair of relatively driven end components, a motor, a reduction gearing driven by the motor and operatively connected to drive a module and the sucessively connected modules and means for measuring the relative positions of the pair of relatively driven end components of said module, said robot comprising as many of said self-contained modules as there are elementary movements of translation and rotation that can be accomplished by the robot, said modules being interconnectable and arranged and disposed in the coordinate axes system for the application contemplated for said robot, and two successive modules being interconnected by a connecting tube of which the length is subordinate to the application contemplated, each end of said tube being detachably fastened to a respective end component of said two successive modules by means of identical standard fastening means.

2. A modular robot according to claim 1, wherein each connecting tube has a circular cross section.

3. A modular robot according to claim 2, wherein the coupling between a module and a connecting tube takes place through the medium of a centering element carried by one face of said module and having a cross-sectional shape consistent with that of said tube so as to penetrate with a moderate play into said tube, and through the medium of a flat direction face carried by said module at right angles to the axis of said centering element, the end face of the connecting tube being caused to bear against said flat direction face of the module.

4. A modular robot according to claim 3, wherein the connecting tube is fastened to a centering element by a setting product which fills the space contained between the inner wall of said connecting tube and said centering element, each end of said tube being kept in contact with said flat direction face of its associated module.

5. A modular robot according to claim 3, wherein each module is further connected to the relevant connecting tube by means of an external groove of semi-circular cross-sectional shape, formed in said connecting tube at a distance from its relevant end which is substantially one-half of the axial-length of the centering element, said groove being formed around the complete tube periphery, and engageable by an open circlip having a corresponding circular cross-section and engaging said groove while supporting a keeper ring said keeper ring having such a thickness that, when said keeper ring is secured to the flat direction face the flat direction face of said module, whereby when said keeper ring is locked in position by means of screws, said keeper-ring is prevented from contacting said flat direction face.

6. A modular robot according to claim 1, wherein each connecting tube has a rectangular cross section.

7. A modular robot according to claim 6, wherein the coupling between a module and a connecting tube takes place through the medium of a centering element carried by one face of said module and having a cross-sectional shape consistent with that of said tube so as to penetrate with a moderate play into said tube, and through the medium of a flat direction face carried by said module at right angles to the axis of said centering element, and end face of the connecting tube being caused to bear against said flat direction face of the module.

8. A modular robot according to claim 7, wherein the connecting tube is fastened to a centering element by a setting product which fills the space contained between the inner wall of said connecting tube and said centering element, each end of said tube being kept in contact with said flat direction face of its associated module.

9. A modular robot according to claim 7, wherein each module is further connected to the relevant connecting tube by means of an external groove of semi-circular crosssectional shape, formed in said connecting tube at a distance from its relevant end which is substantially one-half of the axial-length of the centering element, said groove being formed around the complete tube periphery, and engageable by an open circlip having a corresponding circular crosssection and engaging said groove while supporting a keeper ring said keeper ring having such a thickness that, when said keeper ring is secured to the flat direction face the flat direction face of said module, whereby when said keeper ring is locked in position by means of screws, said keeper ring is prevented from contacting said flat direction face.

10. A modular robot according to claim 1, wherein said standard fastening means is detachably secured to its associated tube.

* * * * *